July 10, 1934.  P. A. NOXON  1,966,354
HIGH SPEED TELEGRAPH SYSTEM
Filed Dec. 22, 1932  4 Sheets-Sheet 1
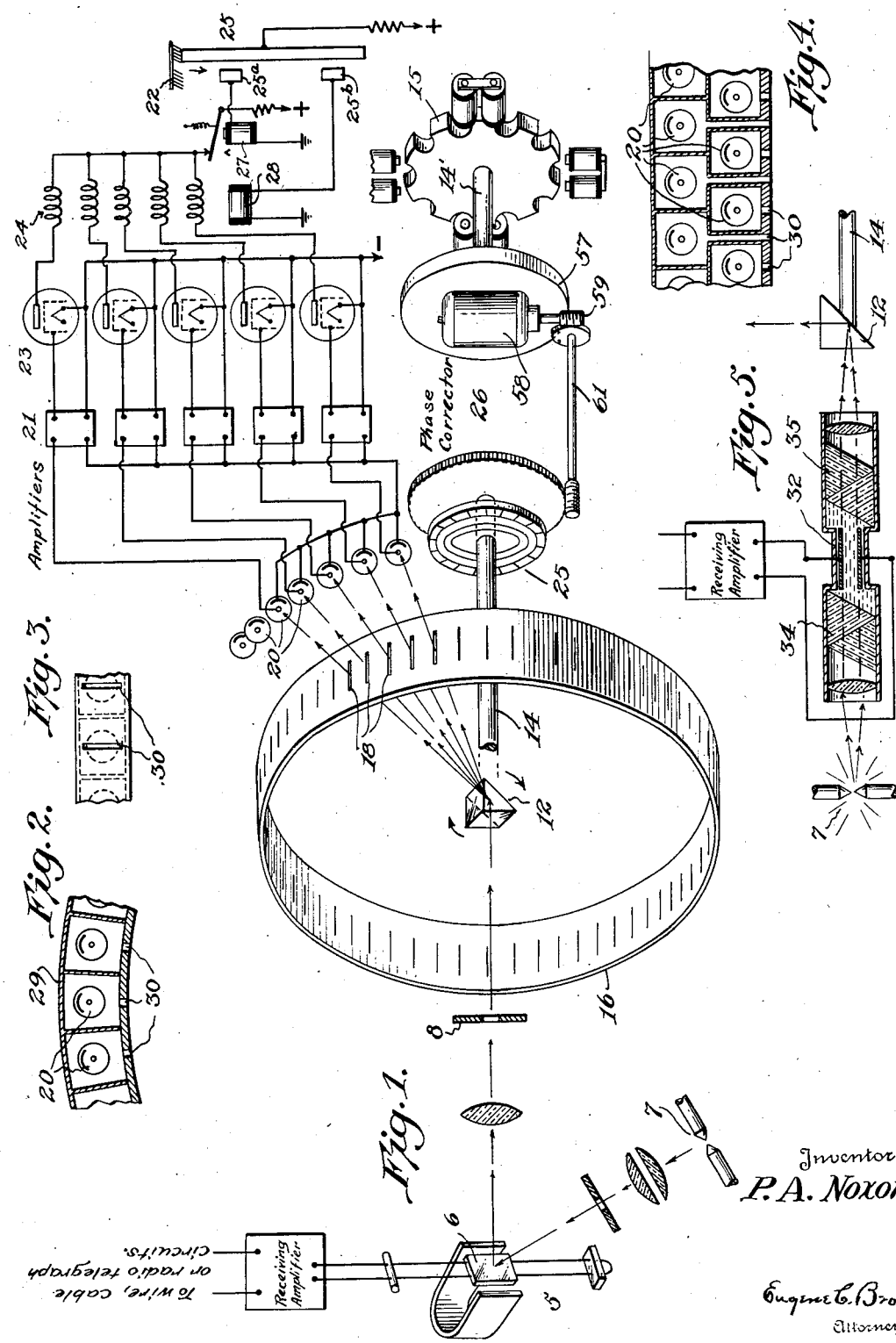

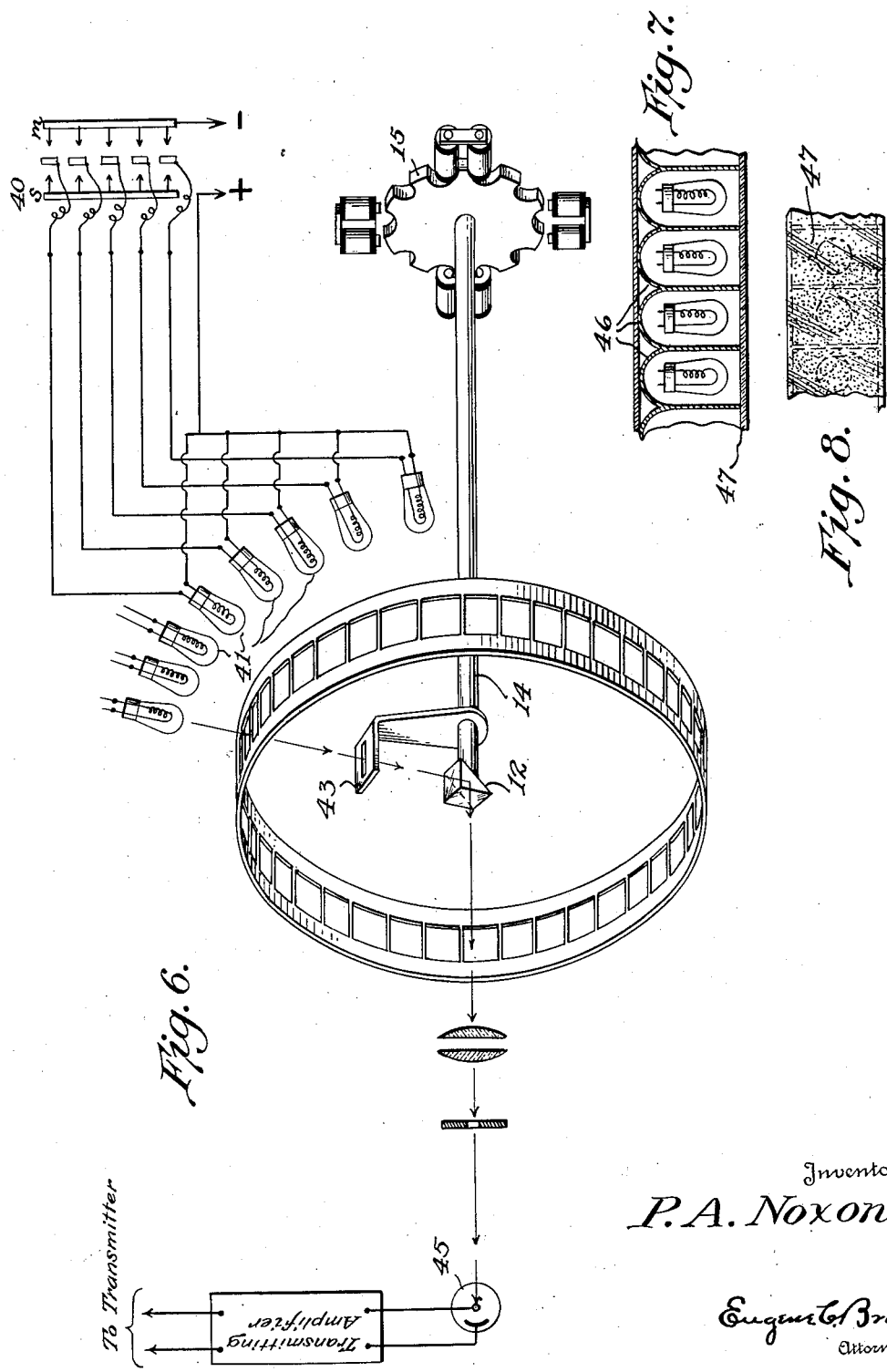

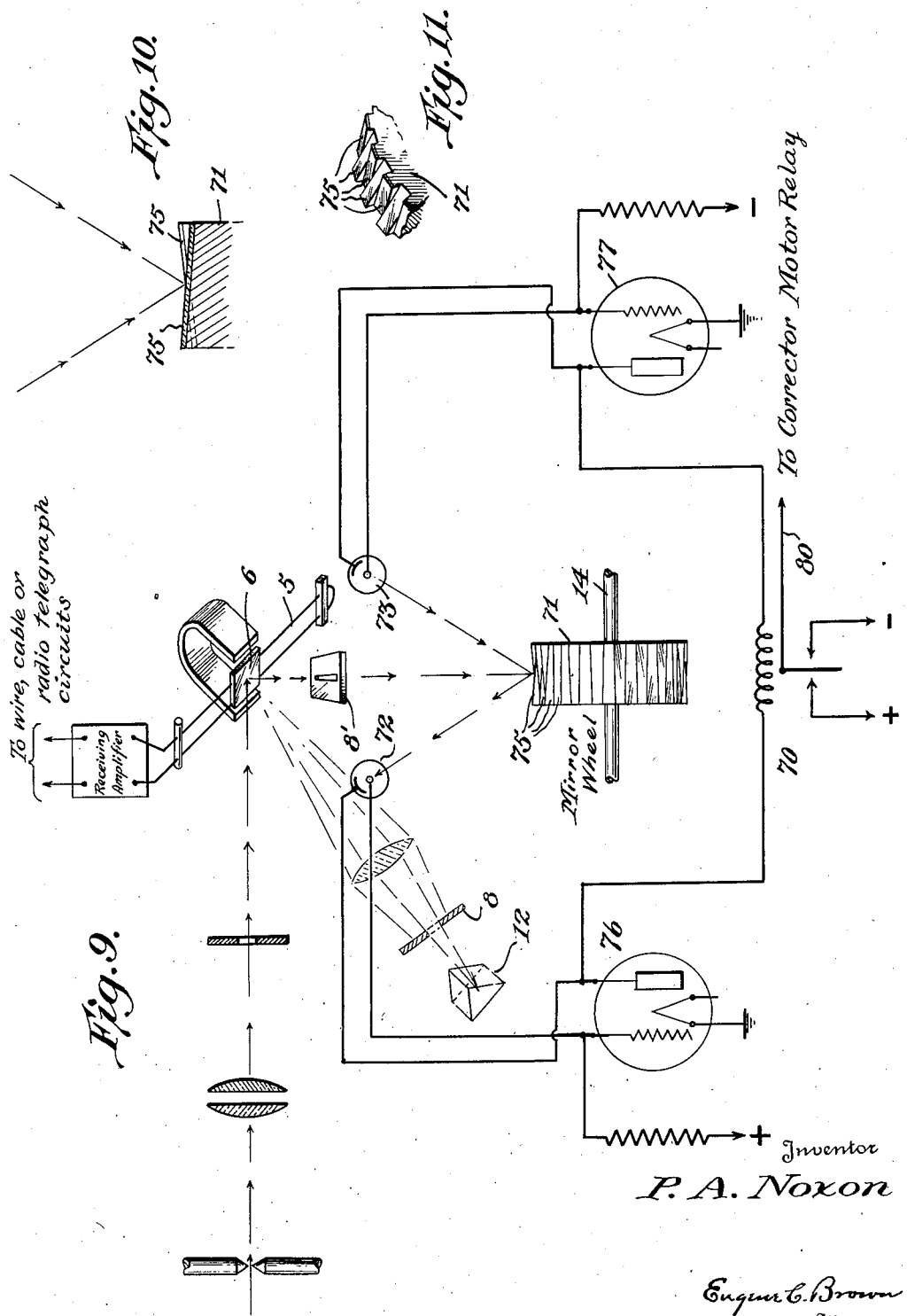

Inventor
P. A. Noxon

Patented July 10, 1934

1,966,354

UNITED STATES PATENT OFFICE 1,966,354

HIGH SPEED TELEGRAPH SYSTEM

Paul A. Noxon, Jackson Heights, N. Y., assignor to The Western Union Telegraph Company, New York, N. Y., a corporation of New York Application December 22, 1932, Serial No. 648,500

9 Claims. (Cl. 178—3)

The present invention pertains to high-speed telegraph apparatus predicated for its operation upon the use of conversion means which are practically free from inertia and frequency limitations. Insofar as its fundamental features are concerned the methods herein disclosed are applicable to any form of synchronous telegraph code and can be used in connection with land lines, ocean cables or radio-telegraph systems.

The object of my invention is to eliminate the relay devices involving mechanically moved contacts and to convert the telegraph signals into current impulses through the medium of light beams and photo-electric cells.

In the following description I shall refer to the accompanying drawings in which—

Figure 1 is a schematic drawing illustrating apparatus for receiving and recording telegraph signals;

Figures 2, 3 and 4 are fragmentary detail views showing arrangements for grouping and shielding the photo-electric cells;

Figure 5 is a fragmentary detail view showing a light valve embodying a Kerr cell for modulating the beam of light;

Figure 6 is a schematic drawing illustrating a transmitting apparatus embodying my invention;

Figures 7 and 8 are fragmentary detail views illustrating one arrangement for grouping the incandescent lamps employed in the transmitter;

Figure 9 is a schematic drawing illustrating an arrangement for operating the phase correcting relay;

Figures 10 and 11 are fragmentary detail views of the mirror wheel of the corrector apparatus.

Figure 12:
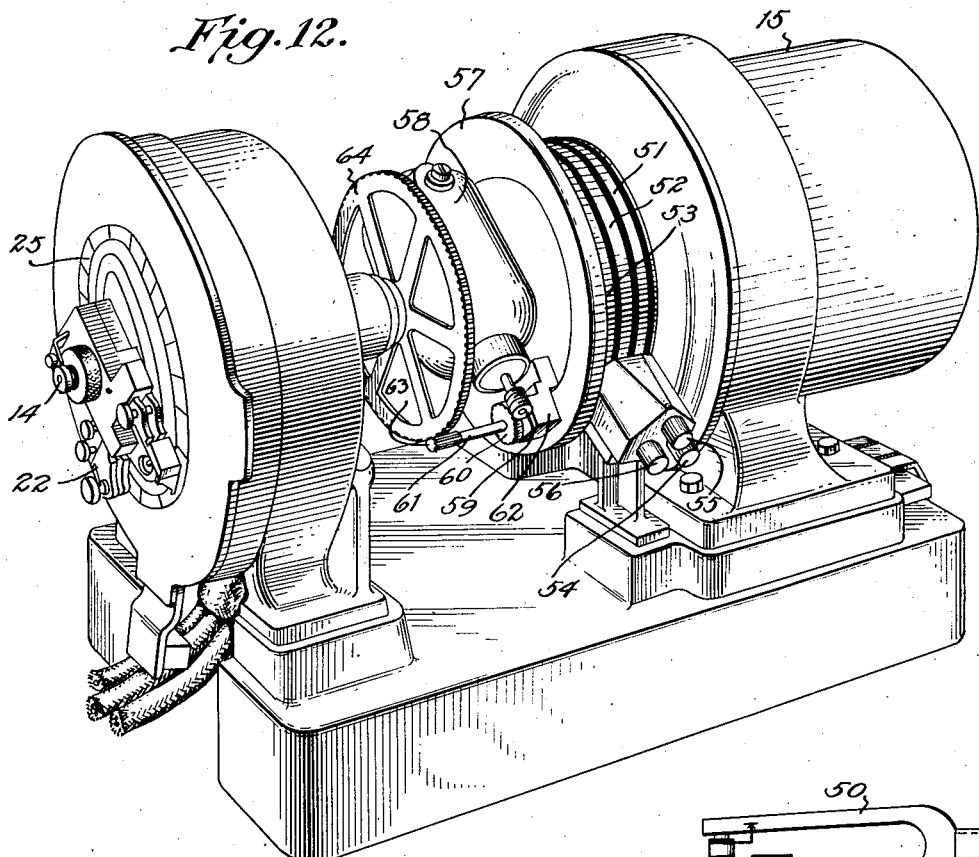
Figure 12 is a perspective view and Figure 13 is a diagrammatic view of a corrector device which may be employed in my system.

Referring to Figure 1, the received signals actuate the oscillograph element 5 and cause the mirror 6 to reflect a beam of light from the light source 7 upon a screen 8, in such a manner that a marking signal causes the beam of light to pass through the aperture therein while the deflection of the oscillograph element due to a spacing signal directs the beam of light on to the opaque portion of the screen. The beam of light, modulated in this manner, is directed axially on to a rotating prism or mirror 12 carried by the shaft 14 driven by the phonic wheel or La Cour motor 15 operated synchronously with the transmitted signals. As the prism is rotated, the beam sweeps around the inner surface of a cylindrical stationary ring 16 having a series of axial slits 18 through which the light beams pass in succession and are intercepted by photo-electric cells 20 placed in alinement with the slots. Each slot or aperture with its associated cell may be said to represent a receiving segment in the ordinary telegraph receiving apparatus. As the beam of light rotates in synchronism with the distant transmitter elements, the photo-electric cells are excited in the order determined by the character which is being transmitted and can be made to transfer the combination to a standard printer or other selecting element by means of a suitable amplifier. For purposes of illustration I have shown one group of five photo-electric cells, which may constitute one channel of a multiplex system, connected by means of amplifiers 21 to the input of thermionic tubes of the thyratron type 23, the output of the tubes being connected to the selectors 24 of the recording or repeating instrument. After each character selection has been set up the brushes 22 of the distributor 25 pass over the segment 25$^a$ causing the relay 27 to attract its armature thereby disconnecting the current source and deenergizing the tubes. When the brushes pass over the segment 25$^b$ the printer magnet 28 is energized to record the selected character.

I have illustrated conventionally at 26 a phase correcting apparatus of the continuously correcting type. An apparatus which is adapted for this purpose is disclosed in the application of O. E. Pierson Ser. No. 537,732, and is described more fully hereinafter.

The photo-electric cells may be arranged in shielding housings 29 provided with slits 30 as indicated in Figures 2 and 3. A more compact arrangement is shown in Figure 4 in which the cells are in staggered formation.

The oscillograph element 5 and mirror 6 carried thereby cooperate with the screen 8 to constitute a light valve which directs the beam of light upon the reflecting surface of the prism 12 when marking impulses are received, while directing the beam upon an opaque portion of the screen when spacing impulses are received. Instead of deflecting the beam of light by means of an oscillograph element as above described, I may modulate the beam by other types of light valves. In Figure 5 I have illustrated the use of a well known light valve comprising a Kerr cell, or as it is sometimes termed the Kerr condenser, 32 operating in conjunction with a pair of Nicol prisms 34 and 35. The light control is effected by means of the Kerr cell, i. e. by utilizing the known phenomenon of electrical double refraction in a manner similar to the decomposition of polarized light into two components of different velocity of propagation (vide Phil. Mag. (4) 50 page 337, 1875). As is well known, no light will be transmitted through a pair of Nicol prisms providing that the planes of the polarization of the two prisms are at right angle to each other and the interposed transparent substance does not rotate the plane of the polarized light emerging from the first prism.

If an electric voltage is supplied to the condenser plates of a Kerr cell, the liquid dielectricum will obtain double refractive characteristics. If, therefore, a polarized beam of light is caused to fall through the double refractive liquid, the beam of light will be changed into two components whose plane of polarization is perpendicular or parallel respectively to the direction of the electric lines of force. The phase difference of the components emerging from the Kerr cell and thus the rotation of the plane of polarization of the emerging ray relatively to the incident one, is determined for a Kerr cell of given dimensions and for a definite voltage supplied by the characteristics of the dielectricum. In order to obtain a maximum effect, liquids of highly refractive power and highly insulating characteristics are used. Among the liquids which are suitable as a dielectricum in a Kerr cell are carbon disulphide, nitrobenzene and similar liquids of highly refractive power, which have been used already at the time during which Kerr conducted his experiments.

The potential effect of the exciting current impressed upon the condenser plates of the Kerr cell on the interposed transparent body of the cell causing the rotation of the plane of the polarized light with the result that the light beams are no longer extinguished by the second Nicol prism 35. I am therefore able to arrange a light valve of this type so that a beam of light will be permitted to pass therethrough upon the reception of a marking impulse but will be suppressed upon the reception of a spacing impulse.

Figure 6 illustrates a transmitting apparatus embodying my invention. A conventional tape transmitter 40 is connected with a series of incandescent lamps 41 so that they will be lighted in combinations as the tongues of the transmitter are moved either to the marking or to the spacing contacts in accordance with the character to be transmitted. The lamps are arranged around the periphery of a stationary cylindrical ring provided with axial slots or apertures positioned to emit a beam of light in a radial direction. As the light beams pass through the slot of the screen 43 and fall upon the prism 12 as it is rotated by the phonic motor 15, the beams are deflected successively through an optical system upon a photo-electric cell 45, thereby transmitting code combinations of impulses through the transmitting amplifier to the line or telegraph circuit.

The lamps may be arranged in a housing provided with shielding cells or partitions 46, the outer ends of the cells being covered with a suitable diffusion screen 47.

Figure 13:
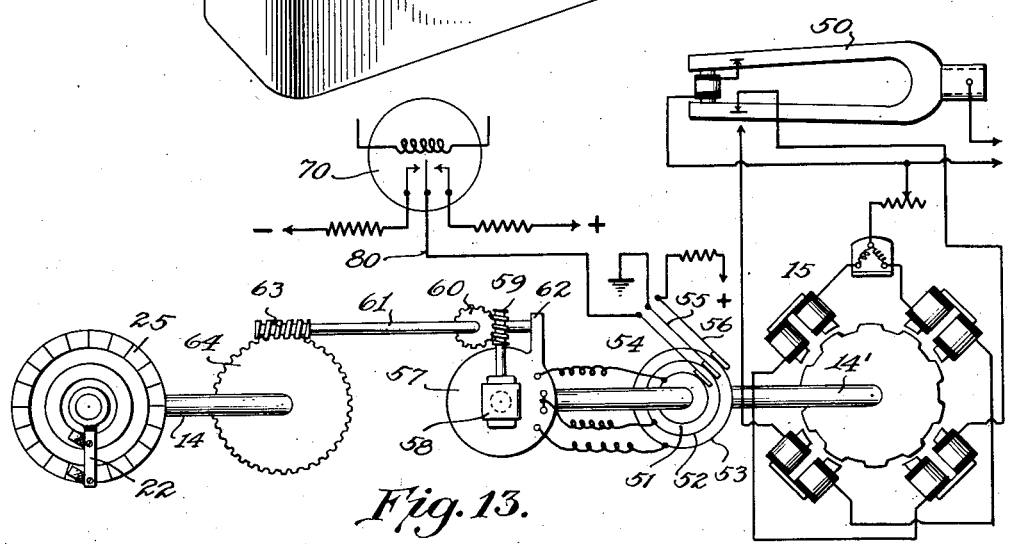

In the above description of the receiving apparatus illustrated in Figure 1, it is necessary to employ a correcting device to maintain the rotating reflecting surface of the prism 12 in exact synchronism with the received signal impulses. Since a small angular displacement of the receiving prism with respect to the distant sending elements represents a large portion of the transmitted signal with high frequencies, it would not be practicable to make use of a step-by-step correcting mechanism, such as is commonly employed (see Yorke and Benjamin Patent #1,298,622). The correcting device disclosed in the application of Pierson above referred to is capable of the precision required in my system if the limitations of brushes and relays disclosed in said application are eliminated. I have illustrated the Pierson correcting device in Figs. 12 and 13. It comprises a driving motor 15 of the La Cour type controlled by a vibrating fork 50, to operate in substantial synchronism with the transmitting distributor. A series of three slip rings 51, 52 and 53 carried by the motor shaft 14' are engaged by brushes 54, 55 and 56 respectively. Also mounted upon the motor shaft is a disc 57 carrying a small direct current motor 58 having one terminal of its armature connected to the slip ring 51, the other armature terminal and one terminal of the field winding being joined to slip ring 52 and the opposite field terminal being connected to ring 53. The motor 58 is adapted to rotate in either direction by reversing the polarity of either its field or armature windings. A worm 59 on the end of the motor shaft meshes with a gear 60 on a stub shaft 61 bearing in a block 62 carried by the disc 57. The free end of the shaft 61 has a pinion 63 engaging with a large gear 64 fixed on the end of the shaft 14 which carries the prism. The brushes 22 of distributor 25 carried by the shaft 14 rotate across the face plate of the distributor in the usual manner.

The driving force of the La Cour motor 15 is transmitted to the shaft 14 entirely through the stub shaft 61 and gear 64, the motor shaft 14' and prism shaft 14 normally rotating in unison.

The shaft 14 may be advanced or retarded relative to the motor shaft 14', however, by operating the small direct current motor 58 either forward or backward as will be obvious and such relative adjustment of the prism shaft 14 may occur in infinitesimal increments.

In order that the correcting relay 70 may send a correcting impulse to the phase adjusting motor 58 instantaneously with the received impulse, I have shown an arrangement in Fig. 9 for actuating the corrector relay under the control of a light beam directed by the mirror 6 of the oscillograph member, the latter being under the control of the received signals. A beam of light deflected from the mirror 6 passes through a slot in an opaque screen 8' only at the moment of cross-over from a marking position to a spacing position or vice versa. The beam passing through the slot is incident on a reflecting wheel 71 mounted on the same shaft 14 as the receiving prism 12 which alternately deflects the beam of light upon two photo-electric cells 72, 73. As shown in Figs. 10 and 11, the mirror surfaces 75 are mounted upon the periphery of the wheel and are inclined alternately. there being twice as many mirror surfaces as there are slots or receiving apertures 18 in the drum 16. Hence if the shaft 14 is rotating in exact phase with the received signal impulses or with the transmitter at the sending station, both photo-electric cells 72, 73 will receive equal excitation in the form of a series of flashes. However, if the receiving shaft 14 drifts out of phase by a slight amount, one photo-electric cell will receive longer flashes than the other and will correspondingly increase the plate current of its associated amplifier tube 76 or 77. This will cause an unbalance of current in the coil of the corrector relay 70, common to both amplifiers, moving its tongue to one side or the other, dependent upon which cell is receiving the greater excitation. Accordingly current of the proper polarity is instantly applied through the tongue and conductor 80 to the correct motor 58 to advance or retard the phase of the shaft 14 and the prism 12.

I claim:

1. In a high speed telegraph system, the method of recording the received code combinations of impulses, which comprises controlling by the polarity of said impulses a beam of light rotating continuously in the same direction in synchronism with the transmitted impulses in the path of successive light responsive media, and causing the activated media to energize corresponding code recording elements.

2. In a high speed telegraph system, the method of recording the received code combinations of impulses, which comprises controlling by the polarity of said impulses a light valve positioned in the path of a beam of light rotating continuously in the same direction in synchronism with the transmitted impulses, activating in succession one or more of a series of light responsive media in accordance with the positioning of the light valve, and effecting the operation of code selecting elements corresponding to said activated media.

3. In a high speed telegraph system, the step in the method of transmitting the code impulses between one terminal and the other which comprises activating light responsive media in accordance with a beam of light, modulated by successive code combinations of impulses and directed thereon from a reflecting surface rotating continuously in the same direction synchronously with the transmitted impulses.

4. In a high speed telegraph system, means responsive to received signal code impulses for modulating a beam of light, a series of light responsive elements, a reflector in the path of said beam rotating in synchronism with the transmitted code impulses and adapted to project the reflected beam upon said elements in succession, thermionic devices conditioned for operation by said light responsive elements, signal character selector elements, and means including a source of current for connecting said thermionic devices in circuit with said selector elements respectively to cause operation thereof.

5. In a high speed telegraph system, means responsive to received signal code impulses for modulating a beam of light, a series of light responsive elements, a reflector in the path of said beam rotating in synchronism with the transmitted code impulses and adapted to project the reflected beam upon said elements in succession, electro-responsive devices conditioned for operation by said light responsive elements, signal character selector elements, means including a source of current for connecting said electro-responsive devices in circuit with said selector elements respectively, and means for disconnecting said source of current after the selection of each code character.

6. In a high speed telegraph system, a source of light waves, a series of light responsive elements, code signal selector elements operating in response to the activation of said light responsive elements, a reflector operating in synchronism with transmitted signal code impulses and adapted to project the light waves upon said responsive elements in succession, and valve mechanism interposed between said source and said reflector operating in response to received signal impulses to control the projection of light waves upon the reflector.

7. In a high speed telegraph system, a source of light waves, a series of light responsive elements, code signal selector elements operating in response to the activation of said light responsive elements, a reflector operating in synchronism with transmitted signal code impulses and adapted to project the light waves upon said responsive elements in succession, a driving motor for said reflector operating in synchronism with the transmitted code impulses, corrector mechanism interposed between said motor and said reflector and responsive to said light waves for maintaining the reflector in correct phase relation with the transmitted impulses, and signal responsive devices actuated in accordance with the operation of said elements.

8. In a high speed telegraph system, means responsive to received signal code impulses for modulating a beam of light, a series of light responsive elements, a reflector in the path of said beam rotating in synchronism with the transmitted code impulses and adapted to project the reflected beam upon said elements in succession, signal responsive devices actuated in accordance with the operation of said elements, a driving motor for said reflector operating in substantial synchronism with the signal impulses, a pair of light responsive devices, mirror surfaces operated by said motor for activating said devices equally when said reflector is in correct phase relation with said impulses and unequally upon a departure from correct phase relation, and means responsive to said unequal activation to adjust said reflector either forward or backward with respect to the shaft of said driving motor dependent upon the departure from correct phase relation.

9. A system for correction of phase departure in synchronous apparatus, comprising means for receiving signal impulses of opposite polarity, a reflector actuated by said receiving means adapted to oscillate a light beam in one direction or the other, a rotary member provided with mirror surfaces inclined alternately in opposite directions, a driving motor for said member operating in substantial synchronism with said signal impulses, a pair of light responsive devices upon opposite sides of the mid-point of the oscillations and so positioned that one or the other is activated by the light beam reflected from one of said inclined surfaces as the beam crosses the mid-point, and means responsive to an unequal activation of said light responsive devices for adjusting said rotary member either forward or backward with respect to the shaft of said driving motor.

PAUL A. NOXON.